Feb. 4, 1964
L. R. KAHN
3,120,642
AUTOMATIC GAIN CONTROL IN INDEPENDENT SIDEBAND TYPE TRANSMISSION SYSTEMS AND THE LIKE
Filed Sept. 25, 1961
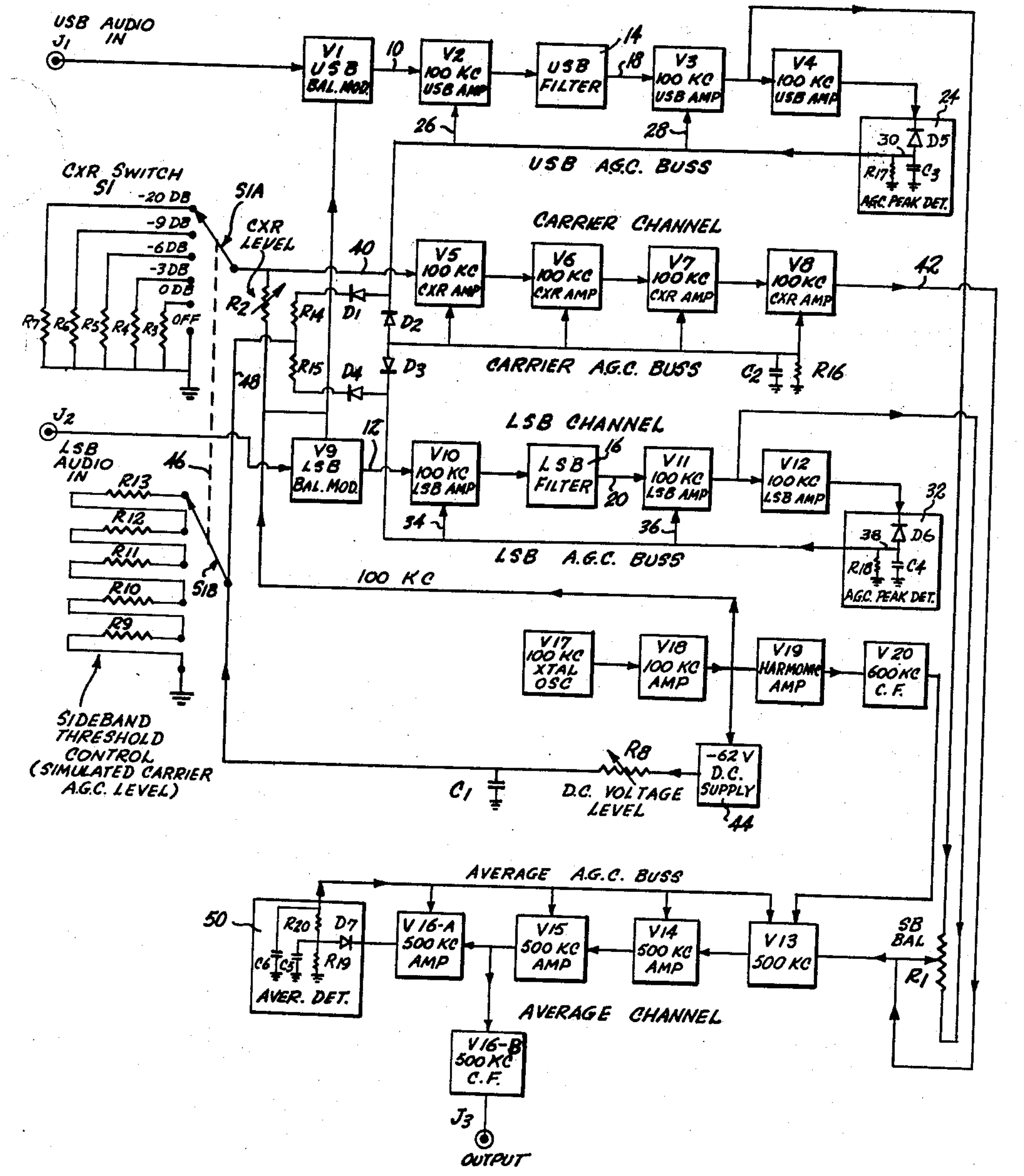
INVENTOR.
LEONARD R. KAHN
BY Mathis and Graybeal
ATTORNEYS United States Patent Office 3,120,642

Patented Feb. 4, 1964

3,120,642
AUTOMATIC GAIN CONTROL IN INDEPENDENT SIDEBAND TYPE TRANSMISSION SYSTEMS AND THE LIKE

Leonard R. Kahn, 81 S. Bergen Place, Freeport, N.Y.

Filed Sept. 25, 1961, Ser. No. 140,530
18 Claims. (Cl. 325—330)

The present invention relates to radio transmission systems of the type involving a carrier with independently modulated sidebands, i.e. so-called independent sideband systems or double single sideband systems, such as disclosed in my U.S. Patent No. 2,903,518, issued September 8, 1959. Applicable systems are also known as floating carrier systems, wherein a constant output level is maintained in the instance of a strong sideband signal by reduction in carrier level, i.e. the carrier level "floats" to accommodate strong sideband signal levels.

More particularly, the present invention provides an improved automatic gain control method and associated circuitry for compositely modulated, floating carrier transmission systems, such improvement being characterized by the upper sideband and lower sideband signals being initially developed in separate channels, without any substantial AGC interaction, but with each sideband signal effecting carrier compression when stronger than the carrier.

According to the present invention, when the sideband signals are low the gain of each sideband channel and the carrier channel are all controlled by what is termable as a simulated AGC control voltage or "threshold" AGC voltage, predetermined to provide so-called "full carrier" operation. Then, when the signal level of either sideband channel is strong enough to generate in that sideband channel an AGC voltage exceeding the threshold level, the AGC voltage responsive to the strong sideband signal overrides the simulated AGC control voltage and controls the gain in that sideband channel and the gain of the carrier channel, but is decoupled from and does not override the simulated AGC control voltage controlling the gain of the other sideband channel. In other words, the AGC circuitry of the present invention provides that the requirement of an essentially constant average output level is dynamically maintained in the instance of a strong sideband signal by the strong sideband signal effecting carrier compression or so-called "compressed carrier" operation, but without substantial compression of the weaker sideband.

In an independent or double single sideband system, it is important that the transmitter maintain a constant average output. At low modulation levels, the carrier essentially determines the average output amplitude, but in prior systems when one independent sideband becomes stronger then the strong sideband not only reduces the carrier gain but also reduces the gain of the weaker sideband, so that the weaker sideband is subjected to what is known as syllabic crosstalk. In general, as indicated, the present improvement essentially involves the stronger sideband controlling the carrier level, but never the other sideband level, so that syllabic crosstalk is minimized.

Also characteristic of the invention, the gain control circuitry in each of the sideband channels is advantageously of the peak detector type, for fast AGC action, and the separately developed carrier and sideband signals are then summated and further amplified in an average circuit, with the average circuit AGC having a slow response characteristic, to further minimize syllabic crosstalk between the sideband signals. The averaging AGC of the average channel has a relatively long time constant, i.e. slow response characteristic, to avoid the possibility of sharp increases in sideband levels causing sideband crosstalk. In effect, the sideband-isolated gain control in the separate carrier and sideband channels reduces average level variation to fluctuations which are relatively small, e.g. on the order of two or three db, then the common or averaging channel for the carrier and sidebands through its slower acting automatic gain control further smooths out the average level so that the two successively applied gain control regulations establish the modulated output as very stable.

These and other objects, features, advantages and characteristics of the gain control arrangements according to the present invention will be apparent from the following description of a typical system transmitter exciter incorporating same, taken together with the accompanying block diagram showing thereof.

Referring to the block diagram, it will be seen that the exciter in general comprises an Upper Sideband Channel, a Lower Sideband Channel, a Carrier Channel, and an Average Channel, all so designated, with each such channel having a separate automatic gain control buss, respectively designated USB AGC Buss, LSB AGC Buss, Carrier AGC Buss, and Average AGC Buss.

The audio input to the Upper Sideband Channel is applied at jack J1 and serves as an input to USB balanced modulator V1, which also receives an input from 100 kc. crystal oscillator V17 through 100 kc. amplifier V18, the frequency 100 kc. being selected as the carrier or carrier related frequency of the system, simply by way of example. Similarly, the audio input for the lower sideband is applied at jack J2, and serves as an input to LSB balanced modulator V9, which also receives the same carrier input as balanced modulator V1.

As known per se, the respective outputs 10 and 12 from balanced modulators V1 and V9 are double sideband, suppressed carrier signals, which are in turn respectively amplified in amplifiers V2 and V10, then the respective undesired lower sideband and undesired upper sideband are filtered out by upper sideband pass filter 14 and lower sideband pass filter 16.

The selected upper sideband and lower sideband signals respectively appear as outputs 18 and 20 from the filters 14 and 16 and are in turn respectively amplified in amplifiers V3 and V11, then fed to sideband balance potentiometer R1.

Automatic gain control circuitry for the Upper Sideband Channel includes amplifier V4, AGC peak detector 24, the USB AGC Buss with its feedback inputs 26, 28 to amplifiers V2 and V3, and diode D1 of a diode network comprising diodes D1, D2, D3, D4, the operation of which is later discussed. Similarly, the automatic gain control circuitry for the lower sideband channel comprises amplifier V12, AGC peak detector 32, the LSB AGC Buss with its feedback inputs 34, 36 to amplifiers V10 and V11, and diode D4 of the diode network D1–D4.

In general, and as discussed in more detail hereinafter, the AGC control level of the USB AGC Buss inputs 26, 28 is determined by either the simulated gain control level input to diode D1 or the USB Channel generated AGC input 30 to the cathode diode D5 in the detector 24 circuit, depending upon which is the more negative. Likewise, the AGC control level of LSB AGC Buss inputs 34, 36 is determined by either the simulated gain control level input to the cathode of diode D4 or the LSB Channel generated input 38 to the cathode of diode D6 in the detector 32 circuit, depending upon which is the more negative.

The Carrier Channel receives a carrier frequency input from crystal oscillator V17 and amplifier V18 by way of a voltage divider circuit comprising carrier level control potentiometer R2 and whichever of resistors R3, R4, R5, R6 or R7 is selected by section S1A of carrier switch S1. Switch section S1A determines the initial carrier level in incremental steps, as designated. The carrier signal thus appearing at the junction between carrier level control R2 and the selected resistor R3, R4, R5, R6, R7 is applied as the input 40 to carrier amplifier V5, thence appears successively in the amplifiers V6, V7, V8 of the Carrier Channel, the output 42 from which goes to the center tap of sideband balance control potentiometer R1.

The simulated automatic gain control for the Carrier Channel is derived from a negative D.C. voltage supply 44. This bias is produced by rectifying a constant amplitude output from amplifier V18 and is fed to a voltage divider circuit comprising D.C. voltage level or carrier gain control resistor R8 and a selected total resistance R9, R10, R11, R12 and R13 determined by the position of sideband threshold control section S1B of carrier switch S1. Switch sections S1A and S1B are ganged together, as indicated at 46, so that the selected simulated carrier AGC level (section S1B) is properly correlated with respect to the selected carrier signal level (section S1A). The simulated carrier AGC level selected by section S1B is applied to the diode network D1–D4 through dropping resistors R14 and R15.

In the diode network D1–D4, and assuming the USB Channel AGC level responsive voltage appearing at 30 in AGC peak detector 24 as well as the LSB Channel AGC level voltage 38 appearing in AGC peak detector 32 are of lesser magnitude than the simulated carrier AGC level voltage established at the cathodes of diodes D1 and D4 by the coupling resistors R14, R15 and the D.C. return resistor R16, then the diode network D1–D4 operates to impress the simulated carrier AGC level voltage on the Carrier AGC Buss, and also on the USB AGC Buss and the LSB AGC Buss. In this situation, diodes D1, D2, D3, D4 are all conductive, while the AGC peak detector diodes D5 and D6 in the upper sideband and lower sideband peak detectors 24 and 32 are non-conductive. However, should the USB AGC Channel voltage appearing at 30 in AGC peak detector 24 exceed the simulated carrier AGC level voltage, then diode D5 conducts, and voltage level 30 controls the USB AGC Buss as well as the Carrier AGC Buss through conduction of diode D2, with such control being restricted to the Upper Sideband Channel and the Carrier Channel in that diodes D1 and D3 are also rendered non-conductive. Conversely, should the LSB AGC Channel generated voltage appearing at 38 in the lower sideband channel exceed the simulated carrier AGC level, then diodes D6 and D3 are conductive, while diodes D2 and D4 are non-conductive so that the voltage at 38 controls the LSB AGC Buss and the Carrier AGC Buss but not the USB AGC Buss.

The plate-to-plate connection of diodes D2 and D3 insures a cutting off of the diode fed the weaker, sideband generated AGC voltage. Thus, to summarize the diode network operation, if the audio inputs to the upper and lower sideband channels are low, then the simulated AGC level fed to diodes D1 and D4 passes through diodes D2 and D3 and controls the gain of the Carrier Channel and the gain of the Upper Sideband and Lower Sideband Channels as well. Then, when either or both of the Upper Sideband and Lower Sideband Channels produce an AGC voltage greater than the simulated carrier AGC voltage, the greater AGC voltage will also control the carrier gain, and because of the polarity of connection in the diode network D1–D4 will not control the other sideband gain. By this arrangement, each sideband AGC level when overriding the carrier level controls only its channel's gain and the carrier gain, and not the gain of the other sideband channel.

In essence, it will be understood that the various diodes D1–D6 are what may be termed voltage responsive coupler-decoupler means, in that in each instance a coupling function is performed when the diode is conductive and a circuit interrupt or decoupling function is performed when the diode is non-conductive.

As has been indicated, the outputs of the Carrier, Upper Sideband and Lower Sideband Channels are combined in sideband balance potentiometer R1, and are passed through the Average Channel, having its own Average AGC Buss, developed by average detector 50. In the Average Channel, there is a possibility of some degree of sideband crosstalk because if one sideband suddenly increases in level it will in view of the averaging action push down the gain of the other sideband. Two factors greatly reduce this problem, however. Firstly, the average circuit employs a long time constant to avoid sudden changes in gain. Secondly, with strong sideband levels independently regulated in the Upper Sideband Channel and Lower Sideband Channel, the amount of total variation in gain of the average channel is very small, e.g., on the order of 2 or 3 db, and the consequent low variation during amplification of the combined sidebands in the overage channel for practical purposes does not generate any substantial syllabic crosstalk, particularly when the average channel has an AGC Buss with a slow response characteristic.

The reason why there are four stages of controlled amplification in the Carrier Channel (amplifiers V5–V8) as compared with the two stages in each of the Sideband Channels (V2, V3 and V10, V11) is that it is advantageous to have a very sharp carrier control function in these channels so that as soon as a sideband becomes greater than the carrier the carrier level is rapidly reduced to compensate. The crossover point in this regard, for example, is approximately —10 db when the carrier switch S1A, S1B is set to place the threshold control at —20 db. Thus, as the level of a given sideband increases, such increase is linear until the sideband level input is —10 db, considering its maximum rated input to be 0 db. At this —10 db point, the sideband level becomes greater than the carrier level and the sideband level controls the AGC level as to its channel and the carrier channel. When the sideband is rated at 0 db level, the carrier must be —20 db in order to meet the —20 db specification assumed above. Therefore, between —10 db sideband audio input level and 0 db sideband audio input level, the carrier level must change 20 db, whereas the sideband level to be held constant requires a change in gain of only 10 db. Thus, twice the gain control on the carrier level is needed than required in either of the sideband channels.

The combined channel inputs from sideband balance potentiometer R1 are fed to mixer stage V13 which also receives a 600 kc. input from cathode follower V20, such 600 kc. signal being in turn derived from the crystal oscillator V17 and amplifier V18 output, through harmonic amplifier V19. In mixer stage V13, the difference frequencies centered on 500 kc. are selected, then amplified in amplifier stages V14, V15, then passed to cathode follower V16B, and then to the output at jack J3. Part of the 500 kc. output from amplifier V15 also goes to amplifier V16A, then to average detector 50 where the circuit comprising diode D7 generates the average AGC control voltage applied to the Average AGC Buss for stages V13, V14, V15 and V16A.

In a typical system, for example, all of diodes D1–D7 are of the 1N458 type and the following tube types are used: V1, 6SL7; V2, 6SK7; V3, 6SK7; V4, 6AC7; V5, 6SK7; V6, 6SK7; V7, 6SK7; V8, 6SK7; V9, 6SL7; V10, 6SK7; V11, 6SK7; V12, 6AC7; V13, 6SA7; V14, 6SK7; V15, 6AC7; V16, 6SN7; V17, 6AC7; V18, 6AC7; V19, 6AC7; and V20, 6J5. Also, in this typical system, the resistors shown in the accompanying drawing have the following values: R1, 350K ohms; R2, 50K; R3, 470K; R4, R5, 2.2K; R6, 2.9K; R7, 3.3K; R8, 180K; R9, 30K; R10, 4.9K; R11, 18K; R12, 1.5K; R13, 1K; R14, 10K; R15, 10K; R16, 1M; R17 (in detector stage 24), 1M; R18 (in detector stage 32), 1M; R19 (in detector stage 76), 1M; and R20 (in detector stage 76), 10M. Also, the condensers shown in the accompanying diagram typically have the following values: C1 (in simulated carrier AGC level circuit), .2 microfarad; C2 (in carrier AGC Buss circuit), .2; C3 (in detector circuit 24), .2; C4 (in detector circuit 32), .2; C5 (in detector circuit 76), .025; and C6 (in detector 76 circuit), .05.

From the foregoing, various circuit design variations, as well as other adaptations, system arrangements, useful component types, and modes of utilization of the AGC control technique characteristic of the invention will be apparent to those skilled in the art to which the invention is addressed, within the scope of the following claims.

What is claimed is:

1. The method of operating a radio transmission system of the type radiating a carrier with independently modulated sidebands, comprising; separately developing and amplifying carrier and sideband signals, controlling the gain of the carrier signal and the sideband signals by a constant bias voltage when the sideband signals are at a low level, separately developing automatic gain control voltages responsive to the sideband signal levels, and controlling the gain of a strong sideband signal and the carrier signal by the automatic gain control voltage developed responsive to the strong sideband signal when the level of the strong sideband signal exceeds a predetermined amount, the gain of the other sideband channel being meanwhile maintained by said constant bias voltage so that syllabic crosstalk between the sideband signals is minimized.

2. The method of operating a radio transmission system of the type radiating a carrier with independently modulated sidebands, comprising; separately developing and amplifying carrier and sideband signals, controlling the gain of the carrier signal and the sideband signals by a constant bias voltage when the sideband signals are at a low level, separately developing automatic gain control voltages responsive to the sideband signal levels, controlling the gain of a strong sideband signal and the carrier signal by the automatic gain control voltage developed responsive to the strong sideband signal when the level of the strong sideband signal exceeds a predetermined amount, the gain of the other sideband channel being meanwhile maintained by said constant bias voltage so that syllabic cross talk between the sideband signals is minimized, combining the carrier and sideband signals, further amplifying the combined signals while developing an average AGC voltage responsive to the level of the combined signals, and controlling the output level of the combined signals with the average AGC voltage thus developed so as to maintain such output level substantially constant.

3. The method of claim 2, comprising developing the sideband level responsive AGC voltages with relatively rapid response characteristics, and developing the average AGC voltage with a relatively slow response characteristic.

4. The method of minimizing syllabic crosstalk in a transmission system of the type producing a carrier with independently modulated sidebands, said method comprising developing carrier, upper sideband and lower sideband signals in separate channels, simulating a full carrier level related gain control voltage, separately detecting the gains of the upper sideband signal and the lower sideband signal and developing an upper sideband signal level responsive AGC voltage and a lower sideband signal level responsive AGC voltage, applying the simulated gain control voltage to said carrier, upper sideband and lower sideband signals when the signal levels of the upper sideband and lower sideband signals are less than a predetermined level with respect to the carrier level, and reducing the carrier gain without reducing the weaker sideband gain when one of the sideband signals exceeds said predetermined level by applying the AGC voltage responsive to the strong sideband level only to the strong sideband signal and the carrier signal.

5. The method of minimizing syllabic crosstalk in a transmission system of the type producing a carrier with independently modulated sidebands, said method comprising developing carrier, upper sideband and lower sideband signals in separate channels, simulating a full carrier level related gain control voltage, separately detecting the gains of the upper sideband signal and the lower sideband signal and developing an upper sideband signal level responsive AGC voltage and a lower sideband signal level responsive AGC voltage, applying the simulated gain control voltage to said carrier, upper sideband and lower sideband signals when the signal levels of the upper sideband and lower sideband signals are less than a predetermined level with respect to the carrier level, reducing the carrier gain without reducing the weaker sideband gain when one of the sideband signals exceeds said predetermined level by applying the AGC voltage responsive to the strong sideband level only to the strong sideband signal and the carrier signal, combining the carrier and sideband signals, further amplifying the combined signals while developing an average AGC voltage responsive to the signal level of the combined signals, and controlling the output level of the combined signals with the average AGC voltage thus developed.

6. The method of claim 5, comprising developing the sideband level responsive AGC voltages with relatively rapid response characteristics, and developing the average AGC voltage with a relatively slow response characteristic.

7. In a radio transmission system involving a carrier with independently modulated sidebands radiated at a substantially constant output level, separate amplification channels for the carrier and each sideband, such sideband channels including signal level responsive automatic gain control circuitry, bias means maintaining a simulated gain control level for the carrier channel and the sideband channels when the sideband channels are amplifying low level signals, and voltage responsive coupler-decoupler means connected to gain control circuitry in said carrier channel and connected between the automatic gain control circuits of the sideband channels, such coupler-decoupler means operating so that when the signal level in either of the sideband channels exceeds the simulated gain control level in the carrier channel, the gain control level developed by the strong sideband signal controls its channel and also is coupled to and reduces the gain of the carrier channel, but is decoupled from controlling the gain of the other sideband channel, so that syllabic crosstalk between the sideband signals is minimized.

8. A transmission system according to claim 7, wherein said upper sideband responsive automatic gain control circuit and said lower sideband responsive automatic gain control circuit are of the peak detector type, with fast response characteristics.

9. In a radio transmission system involving a carrier with independently modulated sidebands radiated at a substantially constant output level, separate amplification channels for the carrier and each sideband, such sideband channels including signal level responsive automatic gain control circuitry, bias means maintaining a simulated gain control level for the carrier channel and the sideband channels when the sideband channels are amplifying low level signals, voltage responsive coupler-decoupler means connected to gain control circuitry in said carrier channel and connected between the automatic gain control circuits of the sideband channels, such coupler-decoupler means operating so that when the signal level in either of the sideband channels exceeds the simulated gain control level in the carrier channel, the gain control level developed by the strong sideband signal controls its channel and also is coupled to and reduces the gain of the carrier channel, but is decoupled from controlling the gain of the other sideband channel so that syllabic crosstalk between the sideband signals is minimized, said system further comprising means combining the outputs of said upper sideband, lower sideband and carrier channels, an average channel for further amplifying the combined signal, an average automatic gain control detector circuit responsive to the signal level in said average channel, and an average automatic gain control buss in said average channel controlled by the average automatic gain control detector output.

10. A transmission system according to claim 9, wherein said upper sideband responsive gain control circuit and said lower sideband responsive automatic gain control circuit are of the peak detector type, with fast response characteristics.

11. A transmission system according to claim 7, wherein said average automatic gain control detector circuit is characterized by a slow response characteristic.

12. In an independent side band, floating carrier type radio transmission system, wherein carrier and upper and lower sideband signals are developed in separate amplification channels then combined and further amplified in an average channel; a gain control buss for the carrier channel, an AGC buss for the upper sideband channel, an AGC buss for the lower sideband channel, an upper sideband AGC detector circuit, a lower sideband AGC detector circuit, a source of negative D.C. voltage establishing a constant gain control voltage as a threshold gain control level, and voltage responsive coupler-decoupler means applying said constant gain control voltage to said carrier gain control buss and said upper sideband and lower sideband AGC busses when the signals in the upper sideband and lower sideband channels are at less than the threshold AGC level and applying one sideband channel generated AGC voltage to that sideband AGC buss and the carrier gain control buss while maintaining the other sideband AGC buss at the threshold gain control level when the AGC level generated by the said one sideband channel exceeds the threshold gain control level and the AGC level generated in the said other sideband channel is less than the threshold gain control level.

13. A transmission system according to claim 12, wherein the voltage responsive coupler-decoupler means applying threshold and AGC voltages to said carrier, upper sideband and lower sideband busses comprises a diode network including a first diode with its cathode biased by a constant negative D.C. voltage and its plate connected to the upper sideband AGC buss, a second diode with its cathode biased by a constant negative D.C. voltage and its plate connected to the lower sideband AGC buss, a third diode connected with its cathode to said upper sideband AGC buss and with its plate to the carrier AGC buss, a fourth diode connected with its cathode to said lower sideband AGC buss and its plate to said carrier AGC buss.

14. A transmission system according to claim 13, wherein said upper sideband AGC detector circuit comprises a diode with its plate connected to said upper sideband AGC buss, and wherein said lower sideband AGC detector circuit comprises a diode with its plate connected to said lower sideband AGC buss.

15. A transmission system according to claim 14, wherein said upper sideband detector circuit and said lower sideband detector circuit are of the peak detection type, with fast response characteristics.

16. A transmission system according to claim 12, wherein the initial carrier signal level and the threshold gain control level are adjustable by voltage divider networks comprising ganged switch means.

17. A transmission system according to claim 12, wherein said average channel for further amplifying the combined signal comprises an average AGC detector circuit responsive to the signal level in said average channel, and an average AGC buss in said average channel controlled by average AGC detector output.

18. A transmission system according to claim 17, wherein said average AGC detector circuit is characterized by a slow response characteristic.

References Cited in the file of this patent

UNITED STATES PATENTS

| | | |
|---|---|---|
| 2,303,542 | Goodard | Dec. 1, 1942 |
| 2,903,518 | Kahn | Sept. 8, 1959 |